(12) United States Patent
Vasinko et al.

(10) Patent No.: US 12,484,138 B2
(45) Date of Patent: Nov. 25, 2025

(54) COATED NOZZLES FOR ARC TORCHES

(71) Applicant: Kennametal Inc., Latrobe, PA (US)

(72) Inventors: Robert J. Vasinko, Latrobe, PA (US);
Qingjun Zheng, Export, PA (US);
Corinne Charlton, Pittsburgh, PA (US);
Joern Kohlscheen, Forchheim (DE)

(73) Assignee: KENNAMETAL INC., Latrobe, PA (US)

( * ) Notice: Subject to any disclaimer, the term of this patent is extended or adjusted under 35 U.S.C. 154(b) by 479 days.

(21) Appl. No.: 16/593,323

(22) Filed: Oct. 4, 2019

(65) Prior Publication Data
US 2021/0105888 A1 Apr. 8, 2021

(51) Int. Cl.
*H05H 1/34* (2006.01)
(52) U.S. Cl.
CPC ............ *H05H 1/34* (2013.01); *H05H 1/3457* (2021.05)
(58) Field of Classification Search
CPC ....... H05H 1/34; H05H 1/3423; H05H 1/3425
See application file for complete search history.

(56) References Cited

U.S. PATENT DOCUMENTS

| | | | |
|---|---|---|---|
| 4,947,024 A * | 8/1990 | Anderson | B23K 35/0205 219/137.43 |
| 6,963,045 B2 * | 11/2005 | Zapletal | H05H 1/34 219/121.48 |
| 2002/0051885 A1 * | 5/2002 | Braendle | C23C 14/0641 428/408 |
| 2004/0115484 A1 * | 6/2004 | Horling | C23C 14/06 428/698 |
| 2007/0090168 A1 | 4/2007 | Snow et al. | |
| 2008/0273933 A1 * | 11/2008 | Ahlgren | C23C 30/005 407/119 |

(Continued)

FOREIGN PATENT DOCUMENTS

| | | |
|---|---|---|
| DE | 3426410 A1 | 1/1986 |
| DE | 4022111 A1 | 1/1992 |

(Continued)

OTHER PUBLICATIONS

Aug. 30, 2022 Examination notification CN App. No. 112692413A, 2 pages.

(Continued)

*Primary Examiner* — Elizabeth M Kerr
(74) *Attorney, Agent, or Firm* — Christopher J. Owens

(57) ABSTRACT

In one aspect, nozzles for arc torches are described herein comprising refractory coatings for increasing nozzle operational lifetimes via resistance to weld splatter and the associated accumulation of molten metal deposits. In one aspect, a nozzle for an arc torch comprises a first body including a central bore and an exterior surface. A coating is adhered to the exterior surface by thermal spray, physical vapor deposition (PVD), or chemical vapor deposition (CVD), the coating comprising a refractory layer including one or more metallic elements selected from the group consisting of aluminum, silicon and metallic elements of Groups IIIB-VIIIB of the Periodic Table and one or more non-metallic elements selected from Groups IIIA, IVA, VA, and VIA of the Periodic Table.

23 Claims, 2 Drawing Sheets

(56) References Cited

U.S. PATENT DOCUMENTS

| | | | | |
|---|---|---|---|---|
| 2009/0101629 A1* | 4/2009 | Adams | ............ | B33Y 30/00 |
| | | | | 219/121.48 |
| 2009/0123779 A1* | 5/2009 | Endler | ............ | C23C 16/34 |
| | | | | 427/255.391 |
| 2013/0052477 A1* | 2/2013 | Lechthaler | ............ | C23C 28/04 |
| | | | | 428/623 |
| 2014/0023856 A1* | 1/2014 | Bisges | ............ | C23C 4/12 |
| | | | | 428/329 |
| 2015/0211105 A1* | 7/2015 | Schier | ............ | C23C 28/042 |
| | | | | 428/141 |
| 2018/0294062 A1* | 10/2018 | Wolfe | ............ | G21C 3/07 |

FOREIGN PATENT DOCUMENTS

| | | |
|---|---|---|
| DE | 102005032860 A1 | 1/2007 |
| WO | WO2016094388 A1 | 6/2016 |

OTHER PUBLICATIONS

Apr. 13, 2023 Foreign Office Action Chinese Application No. CN202010985989.1, 28 Pages.

Sep. 22, 2023 Foreign Office Action German Application No. DE202010124340 (Pub No. DE102020124340A1), 12 Pages.

Oct. 30, 2023 Foreign Office Action Chinese Application No. CN202010985989, 25 Pages.

\* cited by examiner

COATED NOZZLES FOR ARC TORCHES

FIELD

The present invention relates to arc torches and, in particular, to torch nozzles comprising refractory coatings.

BACKGROUND

Generating plasma for the purpose of cutting or welding is an important tool in the metal working industry. Plasma is generated during various processes including, plasma transferred arc welding, MIG welding (also known as GMAW), TIG welding (also known as GTAW), plasma cutting, plasma spraying. In these methods, the plasma can reach temperatures greater than 20,000° F. At these temperatures, cutting and welding spatter is often significant and inevitably deposits on the welding equipment. Accordingly, maintenance of the equipment is periodically required. Maintenance can include cleaning or replacement of parts having molten metal deposits. When welding with PTA, MIG or plasma cutting, for example, welding fumes and spatter tend to accumulate on the nozzle surface, thereby interrupting arc transfer, decreasing welding and/or cutting efficiency and clogging powder or wire ports. Normally, the welding or cutting is stopped to clean off the nozzle surface or replace the nozzle entirely, depending on the severity of the buildup. Such stoppage is frequent, as current nozzles generally exhibit a maximum of 1-2 hours of continuous cutting or welding time. This limited operational window restricts welding and cutting efficiencies and increases operational costs.

SUMMARY

In one aspect, nozzles for arc torches are described herein comprising refractory coatings for increasing nozzle operational lifetimes via resistance to weld splatter and the associated accumulation of molten metal deposits. In one aspect, a nozzle for an arc torch comprises a first body including a central bore and an exterior surface. A coating is adhered to the exterior surface by thermal spray, physical vapor deposition (PVD), or chemical vapor deposition (CVD), the coating comprising a refractory layer including one or more metallic elements selected from the group consisting of aluminum, silicon and metallic elements of Groups IIIB-VIIIB of the Periodic Table and one or more non-metallic elements selected from Groups IIIA, IVA, VA, and VIA of the Periodic Table. In some embodiments, the refractory layer exhibits a critical load ($L_c$) of at least 45 kgf and/or a residual compressive stress condition of at least 2 GPa. Moreover, a coated nozzle described herein can exhibit a continuous welding lifetime greater than twice the lifetime of an uncoated nozzle.

In another aspect, methods of welding or cutting are described herein. In some embodiments, a method comprises providing an arc torch comprising a nozzle, the nozzle including a first body comprising a central bore and an exterior surface, and a coating adhered to the exterior surface by thermal spray, physical vapor deposition (PVD), or chemical vapor deposition (CVD). The coating comprises a refractory layer including one or more metallic elements selected from the group consisting of aluminum, silicon and metallic elements of Groups IIIB-VIIIB of the Periodic Table and one or more non-metallic elements selected from Groups IIIA, IVA, VA, and VIA of the Periodic Table. A metal or alloy workpiece is welded and/or cut with the plasma torch. In some embodiments, the coated nozzle has a continuous welding or cutting lifetime greater than twice the continuous welding or cutting lifetime of an uncoated nozzle.

These and other embodiments are described in greater detail in the detailed description which follows.

DETAILED DESCRIPTION

Figure 1:
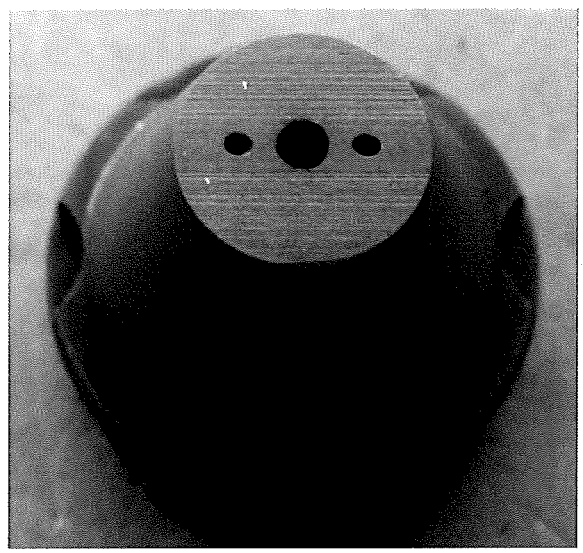
FIG. 1 illustrates a perspective view of a coated nozzle according to some embodiments.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Arc Torch Nozzles

As described herein, a nozzle for an arc torch comprises a first body including a central bore and an exterior surface. A coating is adhered to the exterior surface by thermal spray, physical vapor deposition (PVD), or chemical vapor deposition (CVD), the coating comprising a refractory layer including one or more metallic elements selected from the group consisting of aluminum, silicon and metallic elements of Groups IIIB-VIIIB of the Periodic Table and one or more non-metallic elements selected from Groups IIIA, IVA, VA, and VIA of the Periodic Table.

Turning now to specific components, the refractory layer can comprise any composition falling within the parameters above. The refractory layer, for example, can comprise a carbide, nitride, carbonitride, oxide, oxynitirde or oxycarbonitride of one or more metals selected from the group consisting of aluminum, silicon and metallic elements of Groups IIIB-VIIIB of the Periodic Table. In some embodiments, for example, the refractory layer comprises $M_{1-x}Al_xN$ wherein $0.3 \leq x \leq 0.9$ and M is titanium, chromium or zirconium. In some embodiments, $0.4 \leq x \leq 0.6$. The refractory layer can also comprise $Ti_{1-x-y}Me_yAl_xN$, wherein Me is selected from Groups IVB-VIB of the Periodic Table and $x > 0$, $y \geq 0$, and $0.3 \leq x+y \leq 0.9$. Alternatively, the refractory layer can comprise a metal oxide. In some embodiments, an oxide is selected from the group consisting of chromium oxide, yttria-stabilized zirconia, and aluminum titanium oxide. The ceramic nature of refractory layers described herein renders the refractory layers electrically insulating.

The refractory layer can be deposited by physical vapor deposition (PVD), chemical vapor deposition (CVD), or thermal spray. In some embodiments, the refractory layer exhibits a compressive residual stress condition. The refractory layer, for example, can have a residual compressive stress of at least 2 GPa, in some embodiments. The refractory layer can also have a residual compressive stress selected from Table I.

TABLE I

Refractory Layer Residual Compressive Stress

| Residual Compressive Stress, GPa |
| --- |
| 1-4 |
| 2-4 |
| 0.5-3 |
| 0.1-1 |

In the absence of a specific designation as being compressive, residual stress values described herein can be assigned a negative value to indicate the residual stress is compressive. As is understood by one of skill in the art, residual stress, in the absence of a specific designation, is assigned positive values to indicate tensile stress and negative values to indicate compressive stress.

For refractory layers described herein, a modified $Sin^2\psi$ method was used employing Seemann-Bohlin (S-B) focusing geometry for determining residual stress and shear stress. See V. Valvoda, R. Kuzel, R. Cerny, D. S. Rafaja, J. Musil, C. Kadlec, A. J. Perry, *Thin Solid Films* 193/194 (1990) 401. According to this method, interplanar spacing of all measurable diffraction peaks with different Miller (hkl) indices was determined using the grazing-incidence X-ray diffraction geometry. [Diffraction peaks of different (hkl) planes were collected in a single 2θ scan with a fixed incident-beam angle to the specimen.] Since diffraction planes produce different angles to the sample surface normal in the approach of Perry et al., sample tilting $\psi$ is not necessary. Perry et al. provided that the angle $\psi$ actually corresponds to the Bragg angle θ minus the grazing angle γ ($\psi=\theta-\gamma$). Therefore, in a single 2θ scan, a range of $\psi$ angles is automatically selected when a number of Bragg peaks with different Miller indices are measured at different 2θ angles. The residual stress was then derived from a plot of the lattice parameters calculated from different peaks vs. $Sin^2\psi$.

For refractory layers comprising $M_{1-x}Al_xN$ wherein M is titanium, for example, residual stress and shear stress was determined by x-ray diffraction using the grazing incidence $Sin^2\psi$ method with reference to multiple (hkl) reflections of the TiAlN crystalline phase. The instrument used for residual stress determination was a PANalytical Xpert Pro MRD fitted with an Eulerian cradle for specimen manipulation. The x-ray source was a copper long fine focus x-ray tube operating at 45 KV and 40 MA. The instrument was configured with parallel beam optics for the determination of the stress in the coatings. The incident optics included an x-ray mirror and 0.04 soller slit. The receiving optics included a 0.27 degree parallel plate collimator, a flat graphite monochromator and a sealed proportional counter.

The (111), (200), (220), (311), (222), (331), (420), and (422) reflections of AlTiN were selected for the measurement of the residual stress levels. The grazing incidence angle was selected to minimize the substrate reflections while insuring that entire refractory layer thickness is included in the analysis. Data collection parameters for step size and count time were adjusted for each (hkl) reflection to obtain adequate peak intensity for accurate determination of peak position.

Peak data was then corrected for Absorption and Transparency using the following equations:

Absorption Correction $$A = \left[1 - \frac{\tan(\omega-\theta)}{\tan\theta}\right] \times \left[1 - e^{\left(-\mu t \times \frac{2\sin\theta \times \cos(\omega-\theta)}{\sin^2\theta - \sin^2(\omega-\theta)}\right)}\right]$$

Transparency Correction $$\Delta 2\theta = \frac{180}{\pi} \times \frac{2\tau}{R} \times \frac{\sin(\theta)\cos(\theta)}{\sin(\omega)}$$

$$\text{with } \tau = \frac{t}{\beta} \times \frac{(1-\beta) \times e^{-\beta} - e^{-\beta}}{1 - e^{-\beta}}$$

$$\text{and } \beta = \frac{2\mu t \sin\theta \times \cos(\omega-\theta)}{\sin^2\theta - \sin^2(\omega-\theta)}$$

where:

$t$ = thickness of layer $\mu$ = linear absorption coefficient $(cm^{-1})$ $\theta = 2Theta/2$(degrees)

$(\omega - \theta)$ = omega offset angle (degrees)

$\psi$ = tilt angle (*Psi* stress)(degrees)

$\tau$ = information depth (microns)

$R$ = Radius of goniometers (mm)

The peak data was corrected for Lorentz polarization using the following equation:

Polarization Correction $$LP = \frac{\cos^2 2\theta_{mon} \times \cos^2 2\theta}{\sin\theta}$$

$2\theta_{mon}$ = diffraction angle of graphite monochromator

The $K\alpha_2$ peaks were removed using the Ladell model. Peak positions were refined using a modified Lorentzian shape profile function.

The refractory layer residual stress was calculated from the general equation:

$$\frac{d_{\varphi\psi} - d_0}{d_0} = S_1(\sigma_1 + \sigma_2) + \frac{1}{2}S_2\sigma_\varphi \sin^2\psi$$

where $\sigma_\varphi = \sigma_1 \cos^2\varphi + \sigma_2 \sin\varphi$ $d_{\varphi\psi}$ = lattice constant at angle $\varphi$ and tilt $\psi$ $d_o$ = strain free lattice constant $\varphi$ = rotation angle $\psi$ = specimen tilt $\sigma_1$ & $\sigma_2$ = primary stress tensors in specimen surface $\sigma_\varphi$ = stress at $\varphi$ rotation angle $S_1$ & $1/2 S_2$ = $X$-ray elastic constants $$S_1 = \frac{-\upsilon}{E}$$

$$\frac{1}{2}S_2 = \frac{1+\upsilon}{E}$$

For the present TiAlN analysis Poisson's Ratio ($\upsilon$) was set to 0.20, and the elastic modulus (E in GPa) was determined from nano-indentation analysis conducted with a Fischerscope HM2000 in accordance with ISO standard 14577 using a Vickers indenter. Indentation depth was set to 0.25 µm. Residual stress analysis by XRD can be performed in a similar manner on refractory layers of other compositions by selection of multiple (hkl) reflections appropriate for these compositions, as known to one of skill in the art. Further, Poisson's Ratio ($\upsilon$) and elastic moduli (E) for other refractory layers can also be determined by nano-indentation analysis as described herein.

The refractory layer of the coating can exhibit a critical load ($L_c$) of at least 45 kgf, in some embodiments. In other embodiments, the refractory layer exhibits a critical load ($L_c$) of at least 60 kgf. Critical load of the refractory layer can also have a value selected from Table II.

TABLE II

| Critical Load ($L_c$) of Refractory Layer |
| --- |
| 45-60 kgf |
| 60-100 kgf |
| ≥100 kgf |

Critical load characterizing adhesion of the refractory layer is determined according to the following protocol. A Vicker's indenter with superficial scales is employed that is free of cracks, chip, flaws and adherent surface debris. Also employed are a spot anvil (0.25 inch diameter) and flat anvil (2 inch diameter). The appropriate pre-load (10 kg) for the indenter load being applied is selected. A flat surface of the coated substrate is selected and position on the anvil below the brale indenter and elevating screw is adjusted to the required zero scale position. Indentation(s) are applied at the desired superficial load (e.g. 45, 60, 100, 150 kgf, etc.). The elevating screw is released and the sample is laterally positioned for application of the next load. Indents are spaced to avoid interference effects or contributions from neighboring indentations. The recommended spacing distance is 3-5× the diameter of the indentation. Any debonded but still adherent refractory layer can be removed by immersing the sample in an ultrasonic bath for several minutes. Alternatively, an adhesive tape can be used to remove debonded refractory layer. The indented samples are examined for flaking and delamination along the surface perimeter of the indent under optical microscope (10×-100×). Critical load ($L_c$) is reported at the load where coating flaking and/or delamination occur beyond the diameter of the indent.

Refractory layers described herein can have any desired thickness. Thickness of a refractory layer can be selected according to several considerations including, but not limited to, compositional identity of the layer and deposition technique. A PVD or CVD refractory layer can generally have a thickness of 1-10 µm. In some embodiments, a PVD or CVD refractory layer has thickness of 2-5 µm. Alternatively, a refractory layer deposited by thermal spray can have thickness of 25 µm to 500 µm.

In some embodiments, the refractory layer can be subjected to one or more post-coat treatments. The refractory layer, for example, can be blasted with various wet and/or dry particle compositions. Post coat blasting can be administered in any desired manner. In some embodiments, post coat blasting comprises shot blasting or pressure blasting. Pressure blasting can be administered in a variety of forms including compressed air blasting, wet compressed air blasting, pressurized liquid blasting, wet blasting and steam blasting. Wet blasting, for example, is accomplished using a slurry of inorganic and/or ceramic particles, such as alumina, and water. The particle slurry can be pneumatically projected at a surface of the coated cutting tool body to impinge on the surface of the coating. The inorganic and/or ceramic particles can generally range in size between about 20 µm and about 100 µm. Blasting parameters include pressure, angle of impingement, distance to the part surface and duration.

In other embodiments, the refractory layer is subjected to a polishing post-coat treatment. Polishing can be administered with paste of appropriate diamond or ceramic grit size. Grit size of the paste, in some embodiments, ranges from 1 µm to 10 µm. In one embodiment, a 5-10 µm diamond grit paste is used to polish the coating. A refractory layer described herein can be blasted or polished for a time period sufficient to achieve a desired surface roughness ($R_a$) and/or other parameters, such as increasing residual compressive stress in the refractory layer. In some embodiments, a refractory layer subjected to post-coat treatment has a surface roughness ($R_a$) selected from Table III.

TABLE III

| Post-Coat Surface Roughness ($R_a$) - nm |
| --- |
| ≤500 |
| ≤250 |
| <200 |

The refractory layer can be adhered directly to the exterior surface of the nozzle, in some embodiments. Alternatively, the coating can further comprise one or more intermediate layers between the nozzle exterior surface and the refractory layer. Intermediate refractory layer(s) of the coating can comprise one or more metallic elements selected from the group consisting of aluminum and metallic elements of Groups IVB, VB and VIB of the Periodic Table and one or more non-metallic elements selected from the group consisting of nonmetallic elements of Groups IIIA, IVA, VA and VIA of the Periodic Table. For example, in some embodiments, one or more intermediate layers of TiN, AlTiN, TiC, TiCN or $Al_2O_3$ can be positioned between the nozzle exterior surface and the refractory layer. Intermediate layer(s) can have any desired thickness not inconsistent with the objectives of the present invention. In some embodiments, an intermediate layer has a thickness in the range of 100 nm to 5 µm.

As described herein, a nozzle of the arc torch comprises a first body comprising a central bore and exterior surface. In some embodiments, a second body is arranged in the central bore, wherein a channel is formed between the first body and the second body. The second body, for example, can be concentrically arranged in the central bore of the first body. Similarly, the nozzle can comprise an additional body arranged in the central bore, wherein a channel is formed between the second body and the additional body. Channels formed between the first, second and/or additional bodies can perform various functions, including passages for shield gases, water cooling and/or powder or wire welding material. Depending on functionality, the second and/or additional bodies can be uncoated or at least partially coated with a refractory layer described herein.

Figure 2:
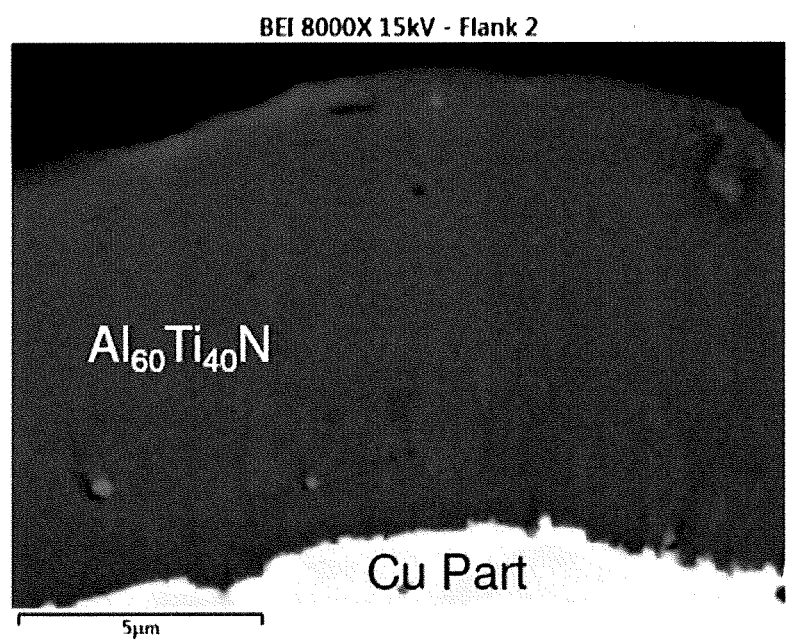
FIG. 2 is a cross-sectional scanning electron (SEM) micrograph of a $Ti_{0.40}Al_{0.60}N$ coating adhered to the exterior surface of a nozzle according to some embodiments.

FIG. 1 illustrates a perspective view of a coated nozzle according to some embodiments. As illustrated in FIG. 1, the nozzle comprises an exterior surface having a coating adhered thereto. In the embodiment of FIG. 1, a $Ti_{0.40}Al_{0.60}N$ refractory layer is adhered to the exterior surface. The $Ti_{0.40}Al_{0.60}N$ refractory layer exhibits a gray color. The nozzle comprises an central aperture for transfer of the arc generated by the torch to the workpiece. The nozzle also includes two apertures adjacent to the central aperture. These apertures can transport shield gas or powder welding material. FIG. 2 is a cross-sectional SEM of the $Ti_{0.40}Al_{0.60}N$ refractory layer adhered to the exterior surface of the nozzle.

The nozzle can be formed of any material consistent with the objectives of the present invention. In some embodiments, for example, the nozzle is formed of copper or copper alloy. Nozzles comprising coatings described herein can exhibit a continuous welding or cutting lifetime greater than twice the lifetime of an uncoated nozzle. A continuous welding or cutting lifetime refers to the time the torch is generating an arc and is engaged in a welding or cutting operation. Accordingly, continuous welding or cutting lifetime does not include time when the torch is not generating an arc. In some embodiments, a nozzle described herein has a continuous welding or cutting lifetime of at least 5 hours. Coated nozzles described herein can be employed with any type of arc torch, including plasma arc torches, plasma transferred arc torches, plasma cutters, and/or torches for MIG welding and TIG welding.

Figure 3:
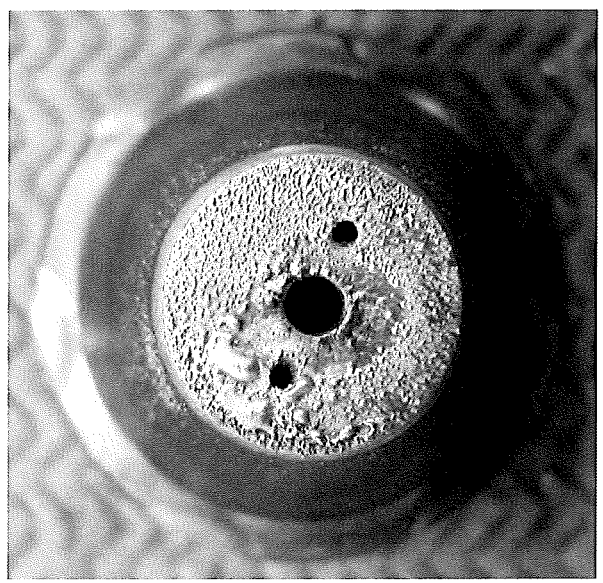
FIG. 3 is a picture of the nozzle of FIG. 1 after seven hours of continuous welding Stellite 6 alloy.

The coated nozzle of FIG. 1 was subjected to 7 hours of continuous welding of Stellite 6 alloy. The coated nozzle was part of an EXCALIBUR® torch commercially available from Kennametal Stellite. FIG. 3 is a picture of the nozzle at the completion of the 7 hours. Notably, the central and adjacent apertures were not occluded with molten metal deposits resulting from weld splatter. A comparative uncoated insert was also subjected to continuous welding of Stellite 6 alloy using the EXCALIBUR® torch. The uncoated nozzle required replacement after three hours of continuous welding.

II. Methods of Welding and/or Cutting

In another aspect, methods of welding or cutting are described herein. In some embodiments, a method comprises providing an arc torch comprising a nozzle, the nozzle including a first body comprising a central bore and an exterior surface, and a coating adhered to the exterior surface by thermal spray, physical vapor deposition (PVD), or chemical vapor deposition (CVD). The coating comprises a refractory layer including one or more metallic elements selected from the group consisting of aluminum, silicon and metallic elements of Groups IIIB-VIIIB of the Periodic Table and one or more non-metallic elements selected from Groups IIIA, IVA, VA, and VIA of the Periodic Table. A metal or alloy workpiece is welded and/or cut with the arc torch. In some embodiments, the coated nozzle has a continuous welding or cutting lifetime greater than twice the continuous welding or cutting lifetime of an uncoated nozzle. Nozzles employed in methods described herein can have any composition and/or properties described in Section I above. Coated nozzles described herein can be employed with any type of arc torch, including plasma arc torches, plasma transferred arc torches, plasma cutters, and/or torches for MIG welding and TIG welding.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A nozzle for an arc torch comprising:
    a first body comprising a central bore and an exterior surface; and
    a coating adhered to the exterior surface by physical vapor deposition (PVD) or chemical vapor deposition (CVD), the coating comprising a refractory layer of $Ti_{1-x-y}Me_yAl_xN$, wherein Me is selected from Groups IVB-VIB of the Periodic Table and $x>0$, $y\geq0$, and $0.3\leq x+y\leq 0.9$.

2. The nozzle of claim 1, wherein the refractory layer has thickness of 1 μm to 10 μm.

3. The nozzle of claim 1, wherein the refractory layer has a critical load ($L_c$) of at least 45 kgf.

4. The nozzle of claim 1, wherein the refractory layer has a critical load ($L_c$) of at least 60 kgf.

5. The nozzle of claim 1, wherein the exterior surface is formed of copper or copper alloy.

6. The nozzle of claim 5, wherein the exterior surface is formed of copper.

7. The nozzle of claim 1, wherein $y=0$ and $0.4\leq x\leq 0.6$.

8. The nozzle of claim 1, wherein the refractory layer has a surface roughness less than 500 nm.

9. The nozzle of claim 1, wherein the nozzle exhibits a continuous welding or plasma cutting lifetime of at least 5 hours.

10. The nozzle of claim 1, wherein the nozzle exhibits a continuous welding or plasma cutting lifetime of at least 7 hours.

11. A method of welding or plasma cutting comprising:
    providing an arc torch comprising a nozzle, the nozzle including a first body comprising a central bore and an exterior surface, and a coating adhered to the exterior surface by physical vapor deposition (PVD) or chemical vapor deposition (CVD), the coating comprising a refractory layer of $Ti_{1-x-y}Me_yAl_xN$, wherein Me is selected from Groups IVB-VIB of the Periodic Table and $x>0$, $y\geq 0$, and $0.3\leq x+y\leq 0.9$; and
    welding or plasma cutting a metal or alloy workpiece with the arc torch.

12. The method of claim 11, wherein the nozzle has a continuous welding or plasma cutting lifetime greater than twice an uncoated nozzle lifetime, the uncoated nozzle having a construction identical to the coated nozzle.

13. The method of claim 11, wherein the refractory layer has thickness of 1 μm to 10 μm.

14. The method of claim 11, wherein the refractory layer has a critical load ($L_c$) of at least 45 kgf.

15. The method of claim 11, wherein the refractory layer has a critical load ($L_c$) of at least 60 kgf.

16. The method of claim 11, wherein the exterior surface is formed of copper or copper alloy.

17. The method of claim 16, wherein the exterior surface is formed of copper.

18. The method of claim 11, wherein $y=0$ and $0.4\leq x\leq 0.6$.

19. The method of claim 11, wherein, the refractory layer has a surface roughness less than 500 nm.

20. A nozzle for an arc torch comprising:
    a first body comprising a central bore and an exterior surface; and
    a coating adhered to the exterior surface by thermal spray, the coating comprising a refractory layer of $Ti_{1-x-y}Me_yAl_xN$, wherein Me is selected from Groups IVB-VIB of the Periodic Table and $x>0$, $y\geq 0$, and $0.3\leq x+y\leq 0.9$.

21. The nozzle of claim 20, wherein the exterior surface is formed of copper or copper alloy.

22. The nozzle of claim 21, wherein the exterior surface is formed of copper.

23. The nozzle of claim 20, wherein the coating is a single layer.

\* \* \* \* \*